United States Patent
Steck

(10) Patent No.: US 9,534,723 B2
(45) Date of Patent: Jan. 3, 2017

(54) METHOD OF BRAZING, IN PARTICULAR INDUCTION BRAZING, AND ASSEMBLY

(71) Applicant: Faurecia Emissions Control Technologies, Germany GmbH, Augsburg (DE)

(72) Inventor: Alfred Steck, Augsburg (DE)

(73) Assignee: Faurecia Emissions Control Technologies, Germany GMBH, Augsburg (DE)

( * ) Notice: Subject to any disclaimer, the term of this patent is extended or adjusted under 35 U.S.C. 154(b) by 3 days.

(21) Appl. No.: 13/894,472

(22) Filed: May 15, 2013

(65) Prior Publication Data
US 2013/0307261 A1 Nov. 21, 2013

(30) Foreign Application Priority Data
May 15, 2012 (DE) .................. 10 2012 009 615

(51) Int. Cl.
| | |
|---|---|
| F16L 41/02 | (2006.01) |
| B23K 1/002 | (2006.01) |
| B23K 3/047 | (2006.01) |
| B23K 1/18 | (2006.01) |
| F16L 41/08 | (2006.01) |

(52) U.S. Cl.
CPC .............. *F16L 41/021* (2013.01); *B23K 1/002* (2013.01); *B23K 1/18* (2013.01); *B23K 3/0475* (2013.01); *F16L 41/084* (2013.01)

(58) Field of Classification Search
CPC ............................ F16L 41/021; F16L 41/023
USPC ....... 285/288.2, 289.5, 289.2, 288.11, 288.5, 285/188, 189
See application file for complete search history.

(56) References Cited

U.S. PATENT DOCUMENTS

| | | | | | |
|---|---|---|---|---|---|
| 1,452,238 | A | * | 4/1923 | Finnigan ................ | B21D 53/00 228/153 |
| 1,556,596 | A | * | 10/1925 | Fey .......................... | 285/288.11 |
| 1,883,439 | A | * | 10/1932 | Adams .................. | F16L 41/004 285/189 |
| 1,908,821 | A | * | 5/1933 | Cornell, Jr. ................... | 285/197 |
| 1,924,121 | A | * | 8/1933 | Jasper ...................... | 285/288.11 |
| 1,933,710 | A | * | 11/1933 | Cornell, Jr. ............ | B23K 31/02 285/133.11 |

(Continued)

FOREIGN PATENT DOCUMENTS

| | | |
|---|---|---|
| CN | 2163289 Y | 4/1994 |
| CN | 102161152 A | 8/2011 |
| CN | 102225483 A | 10/2011 |

*Primary Examiner* — David E Bochna
(74) *Attorney, Agent, or Firm* — Carlson, Gaskey & Olds, PC

(57) ABSTRACT

A brazing method connects an assembly made up of a pipe, a component provided with an opening, and a compensation element. The compensation element includes a support section and an insertion section that is arranged between an end of the pipe and the opening of the component. An inside diameter of the compensation element is smaller than a diameter of the opening in the component. The insertion section is inserted into the end of the pipe, and the support section is located between the pipe and the component and rests on the component at the edge of the opening. The compensation element, the pipe, and the component are heated, preferably inductively, in a region of the compensation element to a temperature above the melting temperature of brazing material that is present in the region of the brazing points.

18 Claims, 2 Drawing Sheets

(56) References Cited

U.S. PATENT DOCUMENTS

| | | | | |
|---|---|---|---|---|
| 1,933,772 | A * | 11/1933 | Stresau | 285/288.2 |
| 1,937,606 | A * | 12/1933 | Taylor | 29/890.142 |
| 1,977,112 | A * | 10/1934 | Coe | 285/189 |
| 2,136,474 | A * | 11/1938 | Straty | 285/288.1 |
| 2,216,033 | A * | 9/1940 | Hopkins | 228/189 |
| 2,496,677 | A * | 2/1950 | Reedy | 285/189 |
| 2,528,040 | A * | 10/1950 | Crouch | 285/288.11 |
| 2,981,556 | A * | 4/1961 | Jackson | F16L 41/084 285/189 |
| 3,516,692 | A * | 6/1970 | Albrecht | F15D 1/00 285/288.1 |
| 3,567,257 | A * | 3/1971 | Nowosadko | 285/289.5 |
| 3,594,025 | A * | 7/1971 | Wagner | E04F 11/1817 285/189 |
| 3,649,055 | A * | 3/1972 | Nilsen | 285/288.1 |
| 3,787,033 | A * | 1/1974 | Snyder | E04F 11/1817 256/59 |
| 3,891,249 | A * | 6/1975 | Moore | 285/189 |
| 3,971,500 | A * | 7/1976 | Kushner | B23K 1/20 285/189 |
| 4,015,321 | A * | 4/1977 | Witter | 29/890.15 |
| 4,103,940 | A * | 8/1978 | Bills | 285/189 |
| 4,179,141 | A * | 12/1979 | Newman | 285/189 |
| 4,305,429 | A * | 12/1981 | Parras | 285/189 |
| 4,351,469 | A * | 9/1982 | Newman | E04F 11/1817 256/65.1 |
| 4,438,955 | A * | 3/1984 | Ryan | 285/189 |
| 4,556,240 | A * | 12/1985 | Yoshida | 285/55 |
| 4,613,168 | A * | 9/1986 | Smith et al. | 285/189 |
| 4,645,242 | A * | 2/1987 | Coleman | F16L 41/082 285/141.1 |
| 5,056,704 | A * | 10/1991 | Martin et al. | 285/288.1 |
| 5,228,727 | A * | 7/1993 | Tokutake | F16L 41/084 285/189 |
| 5,280,971 | A * | 1/1994 | Tokutake et al. | 285/189 |
| 5,951,062 | A * | 9/1999 | Miller | 285/189 |
| 6,126,208 | A * | 10/2000 | Asada | B21C 37/29 123/468 |
| 6,552,294 | B1 * | 4/2003 | Ananthanarayanan et al. | 285/189 |
| 6,698,801 | B1 * | 3/2004 | Boecking | 285/288.1 |
| 7,082,960 | B2 * | 8/2006 | Kim et al. | 285/288.11 |
| 7,237,807 | B2 * | 7/2007 | Hiyama et al. | 285/208 |
| 7,966,857 | B1 * | 6/2011 | Myers | B21D 22/20 29/890.141 |
| 2012/0175872 | A1 * | 7/2012 | Lindsey et al. | 285/189 |

* cited by examiner

METHOD OF BRAZING, IN PARTICULAR INDUCTION BRAZING, AND ASSEMBLY

TECHNICAL FIELD

The present invention relates to a method of brazing and in particular of induction brazing, and to an assembly produced via a brazing method.

BACKGROUND

Brazing and also soldering processes are well suited to connect two metallic components with each other. For the purposes of the following description and claims, brazing and soldering will be collectively referred to as brazing, but it should be understood that the present invention is intended to include both brazing and soldering processes. Unlike in welding processes, in brazing and soldering processes heat is supplied not to a closely limited surface area but, rather, either to the entire component when a furnace brazing method is made use of, or in the region of the brazing point when an induction brazing method is made use of. In this case, the induction of an electric current in the components to be connected generates heat in the component itself, which heats the component such that the brazing material arranged there will fuse.

There is the drawback, however, that for producing an optimum brazed joint, the gaps present between the two components to be connected must be very small. This makes the production of, more particularly, a T-joint complicated, in which a pipe end having an opening is connected in a second component.

It is the object of the present invention to simplify the production of a brazed joint such that with regard to the components to be brazed to one another, no close tolerances need to be adhered to.

SUMMARY

A brazing method for connecting a pipe with a component provided with an opening utilizes a compensation element that is arranged between an end of the pipe and the opening of the component. The compensation element includes a support section and an insertion section, and an inside diameter of the compensation element is smaller than a diameter of the opening in the component. The insertion section is inserted into the end of the pipe, and the support section is located between the pipe and the component and rests on the component at the edge of the opening. The compensation element and the pipe and also the component, in the region of the compensation element, are heated to a temperature above the melting temperature of brazing material that is present in the region of the brazing points. The compensation element allows, in a simple and cost-effective manner, a compensation of tolerances between the end of the pipe and the opening in the component. Use of the compensation element allows tolerances in the radial direction between the inside diameter of the pipe and the diameter of the opening to be compensated.

A suitable brazing method is, more particularly, an induction brazing method. Alternatively, a furnace brazing method may also be used.

Since the inside diameter of the compensation element, more particularly the inside diameter of the insertion section, is smaller than the diameter of the opening in the component, any deviations in the diameter of the pipe have no effect on the effective flow cross-section because the latter is always defined by the compensation element.

In addition, the compensation element may be made use of for compensating both an oblique pipe position and an excessively large distance between the pipe end and the component, and also a lateral offset between the opening in the component and the pipe.

The insertion section of the compensation element is preferably designed to be cylindrical, whereas the support section preferably has the shape of a flat ring.

It is advantageous for the component to have only a slight curvature or to be completely flat in the region of the opening. The component may, for example, be a pipe which has a considerably larger diameter than the pipe to be connected with the component.

The brazing material may be simply preplaced in the form of filler wire rings prior to heating at the brazing points to be formed.

Brazing points may be provided, for example, at the pipe end between the inside of the pipe and the outside of the insertion section of the compensation element and/or between a portion on the edge of the opening of the component and a lower side of the support section of the compensation element.

Prior to the brazing, the insertion section preferably has a radial clearance in relation to the inside of the pipe. This clearance allows the pipe and the compensation element to be arranged such that the pipe can be oriented exactly in the desired position in relation to the component and any deviations in length, diameter, or inclination can be compensated.

Advantageously, the gap between the outside of the insertion section and the inside of the pipe is so small that the liquid filler material is pulled into the gap by capillary forces and can in this way be evenly distributed over the entire brazing point.

The brazed joint between the pipe and the insertion section of the compensation element and the brazed joint between the component and the support section of the compensation element may be produced in one processing step, which saves process time.

An assembly according to the invention includes a pipe, a component having an opening, and a compensation element, as may be used, for example, for producing a brazed joint as described above. The inside diameter of the compensation element is smaller than the diameter of the opening in the component, which results in the advantages described.

The outside diameter of the insertion section of the compensation element is preferably only slightly smaller than the inside diameter of the end of the pipe, in order to ensure a good connection by induction brazing between these two components.

The support section of the compensation element may form a flat ring, the outside diameter of the ring being larger than the diameter of the opening, and the inside diameter of the ring (which advantageously corresponds to the inside diameter of the insertion section) being smaller than the diameter of the opening. This ensures that the opening is completely covered by the compensation element and that sufficient overlap is available at the edge of the opening for producing a brazed joint or else a welded joint. In addition, in this way, a unique, fixed flow cross-section is ensured since, in this arrangement, the flow cross-section is always determined by the inside diameter of the compensation element, that is, the cross-section of the insertion section.

If the outside diameter of the insertion section is smaller than the inside diameter of the end of the pipe, and the outside diameter of the ring is larger than the outside diameter of the pipe, a face side of the pipe end will always meet the support section of the compensation element. In this way, it is possible, for example, to use the compensation element to compensate a deviation in length over part of the circumference or over the entire circumference of the pipe end.

The compensation element is preferably designed such that the length of the insertion section is approximately as large as the width of the support section in the radial direction. Here, the width of the support section may correspond to the width of the flat ring formed by the support section.

BRIEF DESCRIPTION OF THE DRAWINGS

The invention will now be described in more detail below on the basis of an exemplary embodiment with reference to the accompanying drawings, in which.

DETAILED DESCRIPTION

Figure 1:
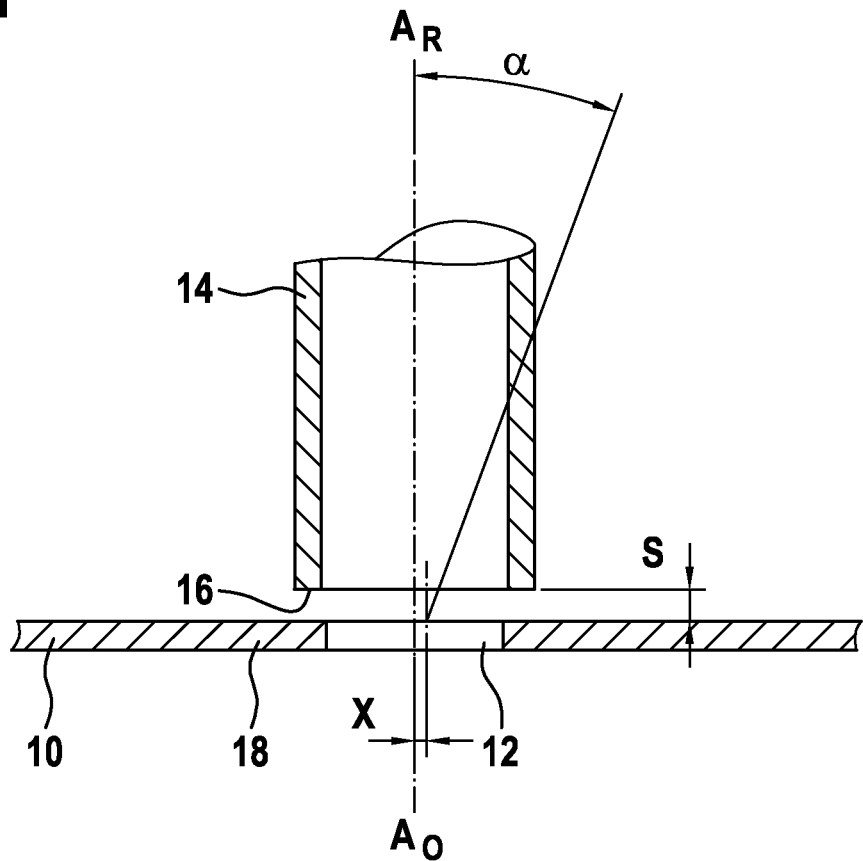
FIG. 1 shows a schematic illustration of a pipe and a component having an opening, which are to be connected with each other via a brazing method.
Figure 2:
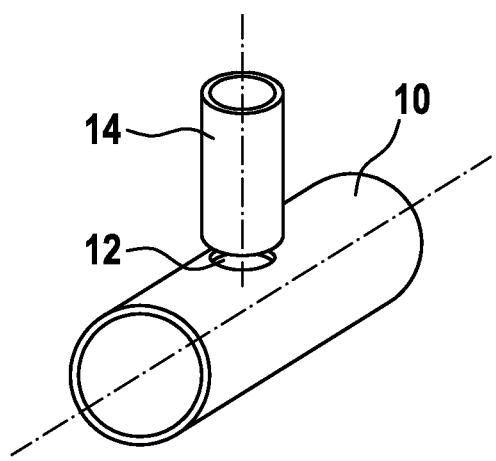
FIG. 2 shows a schematic perspective illustration of the components illustrated in FIG. 1.

FIGS. 1 and 2 show a component 10, in this case a large-diameter pipe (see FIG. 2) having an opening 12. A pipe 14 having a markedly smaller diameter is to be connected with the component 10 by firmly connecting a face side 16 of the pipe end with a substantially flat portion 18 which circumferentially surrounds the opening 12. For an exemplary embodiment, an induction brazing method will be described below. However, a furnace brazing method may also be used. It is basically also possible to weld the two components to each other.

As is shown in FIG. 1, there may be deviations from the ideal position, in which the pipe 14 flatly rests by its face side 16 on the edge of the opening 12 perpendicularly to the extent of the component 10 as shown in FIG. 1. The pipe 14 may, for example, be tilted by an angle α (shown exaggerated in FIG. 1). The longitudinal axis $A_R$ of the pipe 14 may also be offset by an amount x in relation to the surface normal $A_O$ of the opening 12. There may also exist a deviation in the height along the longitudinal axis $A_R$ of the pipe 14, which leads to a gap s between the portion 18 on the edge of the opening 12 and the face side 16 of the pipe 14. It is also possible for a plurality of the deviations described to occur at the same time.

Figure 3:
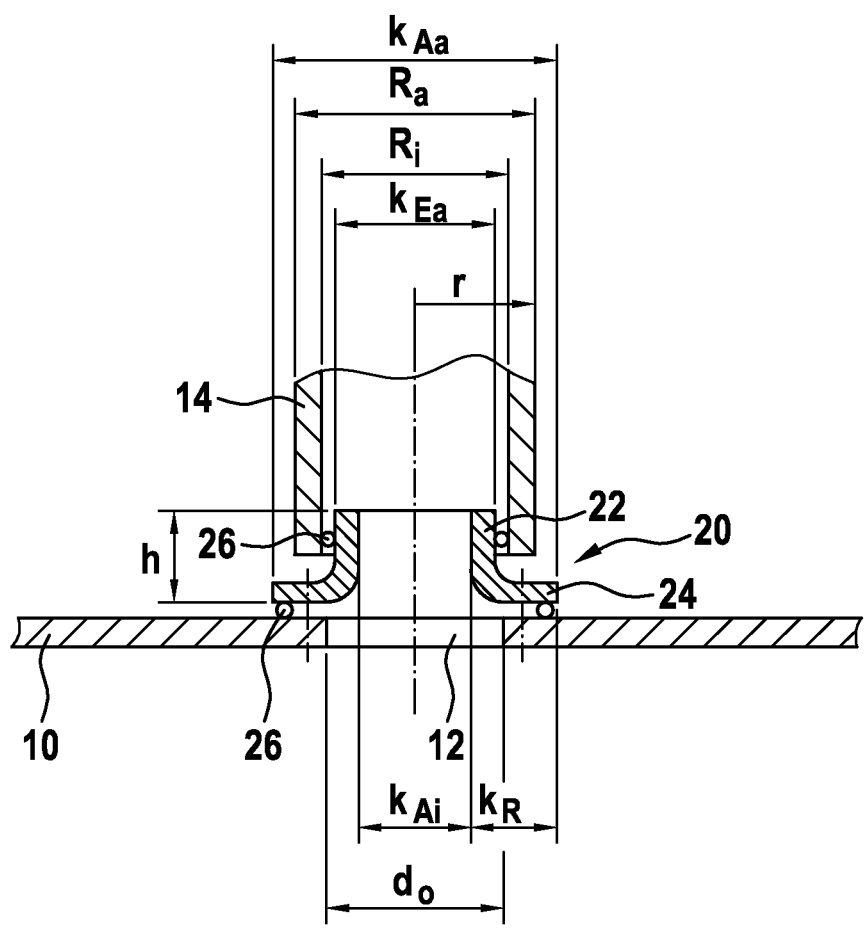
FIG. 3 shows a schematic sectional view of an assembly according to the invention for carrying out a brazing method according to the invention.

All such deviations can be compensated by the use of a compensation element 20 illustrated in FIG. 3.

The compensation element 20 has an insertion section 22 which is in the form of a cylinder tube, and a support section 24 which directly adjoins the insertion section 22 at a right angle and which is shaped in the form of a flat ring. The insertion section 22 and the support section 24 are substantially perpendicular to each other.

The inside diameter $k_{Ai}$ of the support section 24, which also corresponds to the inside diameter of the insertion section 22, is smaller than the diameter $d_O$ of the opening 12.

The outside diameter $k_{Aa}$ of the support section 24, on the other hand, is larger than the diameter $d_O$ of the opening 12.

The width $k_R$ of the support section 24 in the radial direction r, i.e. the width of the ring, corresponds to half the difference between the outside diameter $k_{Aa}$ and the inside diameter $k_{Ai}$. The width $k_R$ is approximately as large as a height h of the insertion section 22 of the compensation element 20 perpendicular to the support section 24.

The outside diameter $k_{Ea}$ of the insertion section 22 is slightly smaller than the inside diameter $R_i$ of the end of the pipe 14.

The outside diameter $k_{Aa}$ of the support section 24 is larger than the outside diameter $R_a$ of the end of the pipe 14.

These geometric relationships result in that the support section 24 rests fully on the portion 18 around the opening 12 of the component 10 when the compensation element 20 is arranged between the pipe 14 and the component 10. The pipe 14 is located radially outside the insertion section 22 of the compensation element 20, and the face side 16 of the pipe end is positioned fully over the support section 24 of the compensation element 20.

The compensation element 20 is produced, for example, by reshaping from a suitable metal that is well suited to be inductively heated.

For assembly, first the compensation element 20 is placed on the component 10 so that the edge of the opening 12 is fully covered by the support section 24 and the insertion section 22 is positioned fully over the opening 12. In this way, the later flow cross-section is defined by the inside diameter $k_{Ai}$ of the compensation element 20.

With no external forces acting, the compensation element 20 may be placed flatly on the portion 18 at the edge of the opening 12.

A ring of a brazing material 26 is preplaced between the component 10 and the support section 24. Instead of a ring of brazing material, brazing paste may also be used. It is also possible to make use of punched rings of brazing foil.

The end of the pipe 14 is fitted onto the insertion section 22 of the compensation element 20 and the pipe 14 is oriented in its desired position with respect to the component 10.

In addition, a ring of a brazing material 26 is preplaced between the pipe 14 and the insertion section 22.

An induction coil (not illustrated) is arranged around the assembly made up of the component 10, the pipe 14 and the compensation element 20, so that the current flow induced by the coil heats the end of the pipe 14, the compensation element 20, and the portion 18 at the edge of the opening 12 to above a temperature at which the entire amount of brazing material 26 placed at the brazing points will melt.

Preferably, the gap between the inner wall of the pipe 14 and the outer wall of the insertion section 22 and also the gap between the component 10 and the lower side of the support section 24 are so small that the brazing material 26 will evenly distribute by capillary effects in the gaps existing there, and a brazed joint is produced which is tight over the entire circumference.

After cooling down, the pipe 14 and the compensation element 20 are firmly and fluid-tightly connected with the component 10.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An assembly comprising:
a pipe;
a component having an opening;
a compensation element, wherein an inside diameter of the compensation element is smaller than a diameter of the opening in the component;
wherein the compensation element is arranged between an end of the pipe and the opening of the component;
wherein the compensation element includes an insertion section at one end that is inserted into the end of the pipe and a support section at an opposite end that is located between the pipe and the component, and wherein the support section of the compensation element forms a flat ring, an outside diameter of the ring being larger than the diameter of the opening, and an inside diameter of the ring being smaller than the diameter of the opening, and wherein the opposite end of the compensation element is placed against an outer surface of the component such that the support section rests on the component at an edge of the opening, and wherein the compensation element extends from the insertion section to terminate at the support section to define an overall length of the compensation element; and
wherein the compensation element, the pipe, and the component are induction heated to a temperature above a melting temperature of brazing material that is present in the region of brazing points.

2. The assembly according to claim 1, wherein an outside diameter of the insertion section of the compensation element is slightly smaller than an inside diameter of the end of the pipe.

3. The assembly according to claim 2, wherein a length of the insertion section is approximately as large as a width of the support section in a radial direction.

4. The assembly according to claim 1, wherein an outside diameter of the insertion section of the compensation element is smaller than an inside diameter of the end of the pipe, and an outside diameter of the support section is larger than an outside diameter of the pipe.

5. The assembly according to claim 1, wherein the entire compensation element is externally located relative to the component.

6. The assembly according to claim 1, wherein the support section is in a non-overlapping relationship with the insertion section.

7. The assembly according to claim 1, wherein the compensation element surrounds an axis and extends from the one end to the opposite end to define a maximum overall length in an axial direction along the axis.

8. An assembly comprising:
a pipe;
a component having an external surface and an internal surface, the component including an opening extending from the external surface to the internal surface;
a compensation element extending from an insertion section at a first end to a support section at a second end, the compensation element being positioned externally of the component, and wherein the insertion section and the support section are substantially perpendicular to each other, and wherein the support section and insertion section are formed as one piece;
wherein the insertion section is inserted into an end of the pipe and wherein the support section rests on the external surface of the component at an edge of the opening such that the second end does not extend into the opening; and
wherein the compensation element, the pipe, and the component are induction heated to a temperature above a melting temperature of brazing material that is present in the region of brazing points such that the compensation element is fixed to the pipe and to the component.

9. The assembly according to claim 8, wherein an inside diameter of the compensation element is smaller than a diameter of the opening in the component.

10. The assembly according to claim 8, wherein the second end comprises a flat ring that forms the support section.

11. The assembly according to claim 10, wherein an outside diameter of the ring is larger than a diameter of the opening, and an inside diameter of the ring is smaller than the diameter of the opening.

12. The assembly according to claim 8, wherein an outside diameter of the insertion section of the compensation element is smaller than an inside diameter of the end of the pipe, and an outside diameter of the support section is larger than an outside diameter of the pipe.

13. The assembly according to claim 8, wherein a length of the insertion section is approximately as large as a width of the support section in a radial direction.

14. The assembly according to claim 8, wherein the second end has a greater outer diameter than an outer diameter of the first end.

15. The assembly according to claim 8, wherein the insertion section is in the form of a cylinder tube and wherein the support section is shaped in the form of a flat ring.

16. The assembly according to claim 8, wherein the support section is in a non-overlapping relationship with the insertion section.

17. The assembly according to claim 8, wherein the compensation element surrounds an axis and extends from the first end to the second end to define a maximum overall length in an axial direction along the axis.

18. An assembly comprising:
a pipe;
a component having an external surface and an internal surface, the component including an opening extending from the external surface to the internal surface;
a compensation element extending from an insertion section at a first end to terminate at a support section at a second, opposite end to define an overall length of the compensation element,
wherein an inside diameter of the compensation element is smaller than a diameter of the opening in the component,
wherein the support section and insertion section are formed as one piece;
wherein the insertion section is in the form of a single-wall cylinder tube and wherein the support section is shaped in the form of a flat ring, the insertion section and the support section being substantially perpendicular to each other with the support section being in a non-overlapping relationship with the insertion section;
wherein the compensation element is positioned externally of the component;
wherein the insertion section is inserted into an end of the pipe and wherein the support section rests on the external surface of the component at an edge of the opening such that the second end does not extend into the opening; and wherein the compensation element, the pipe, and the component are induction heated to a temperature above a melting temperature of brazing material that is present in the region of brazing points such that the compensation element is fixed to the pipe and to the component.

\* \* \* \* \*

UNITED STATES PATENT AND TRADEMARK OFFICE
CERTIFICATE OF CORRECTION

PATENT NO. : 9,534,723 B2
APPLICATION NO. : 13/894472
DATED : January 3, 2017
INVENTOR(S) : Alfred Steck Page 1 of 1

It is certified that error appears in the above-identified patent and that said Letters Patent is hereby corrected as shown below:

In the Claims

In Claim 1, Column 5, Line 30; "the region" should read as --a region--

In Claim 8, Column 6, Line 7; "the region" should read as --a region--

In Claim 18, Column 7, Line 7; "the region" should read as --a region--

Signed and Sealed this
Eighteenth Day of April, 2017

Michelle K. Lee
*Director of the United States Patent and Trademark Office*